(12) United States Patent
Rautenstrauch

(10) Patent No.: US 10,119,547 B2
(45) Date of Patent: Nov. 6, 2018

(54) HOUSING DEVICE FOR A COMPRESSOR STAGE OF A COMPRESSOR DEVICE THAT IS EMBODIED WITH MULTIPLE STAGES AND METHOD FOR MANUFACTURING A HOUSING DEVICE

(71) Applicant: Rolls-Royce Deutschland Ltd & Co KG, Blankenfelde-Mahlow (DE)

(72) Inventor: Marco Rautenstrauch, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 381 days.

(21) Appl. No.: 14/960,868

(22) Filed: Dec. 7, 2015

(65) Prior Publication Data
US 2016/0186762 A1 Jun. 30, 2016

(30) Foreign Application Priority Data
Dec. 29, 2014 (DE) .................. 10 2014 119 673

(51) Int. Cl.
*F04D 19/02* (2006.01)
*F01D 11/12* (2006.01)
(Continued)

(52) U.S. Cl.
CPC ............ *F04D 19/022* (2013.01); *F01D 11/12* (2013.01); *F01D 25/243* (2013.01);
(Continued)

(58) Field of Classification Search
CPC . F05D 2230/54; B23P 15/008; B23P 2700/13
See application file for complete search history.

(56) References Cited

U.S. PATENT DOCUMENTS

| 2,763,462 A | 9/1956 | McDowall et al. |
| 2,772,856 A | 12/1956 | Kent et al. |

(Continued)

OTHER PUBLICATIONS

German Search Report dated Oct. 28, 2015 for related German Application No. DE 10 2014 119 673.2.
(Continued)

*Primary Examiner* — Ninh H Nguyen
*Assistant Examiner* — Jason Davis
(74) *Attorney, Agent, or Firm* — Shuttleworth & Ingersoll, PLC; Timothy J. Klima

(57) ABSTRACT

A housing device for a compressor stage of a compressor device of an aircraft engine that is embodied in a multi-stage design, including a flange area for connection to at least one housing device of another compressor stage that is adjacent in the axial direction. The housing device has a rotor area that during operation of the housing device directly acts together with the rotor blades of a rotor device in the radial direction of the compressor device. Further, the housing device has at least one reception area that is provided for receiving guide blades of a stator device. At least one part of the housing device is made of a sheet metal part. What is further described is a method for manufacturing such a housing device, with at least one part of the housing device being manufactured by means of a forming process.

12 Claims, 4 Drawing Sheets

(51) Int. Cl.
*F01D 25/24* (2006.01)
*F04D 29/52* (2006.01)
*F04D 29/02* (2006.01)
*F04D 29/54* (2006.01)

(52) U.S. Cl.
CPC ........... *F01D 25/246* (2013.01); *F04D 19/02* (2013.01); *F04D 29/023* (2013.01); *F04D 29/522* (2013.01); *F04D 29/526* (2013.01); *F04D 29/542* (2013.01); *F05D 2230/54* (2013.01); *Y02T 50/671* (2013.01)

(56) References Cited

U.S. PATENT DOCUMENTS

| | | | |
|---|---|---|---|
| 2,994,508 A | 8/1961 | Howald | |
| 3,319,930 A | 5/1967 | Howald | |
| 3,338,508 A | 8/1967 | Castle et al. | |
| 4,796,423 A * | 1/1989 | Lievestro | F01D 9/04 403/209 |
| 5,462,403 A | 10/1995 | Pannone | |
| 2005/0042077 A1* | 2/2005 | Gekht | F01D 9/04 415/116 |
| 2009/0047126 A1 | 2/2009 | Ress, Jr. | |
| 2011/0008165 A1 | 1/2011 | Ottow | |
| 2013/0177400 A1 | 7/2013 | Ring | |
| 2013/0259664 A1* | 10/2013 | Denis | B23K 31/02 415/182.1 |
| 2015/0159554 A1 | 6/2015 | Cretin et al. | |

OTHER PUBLICATIONS

European Search Report dated May 23, 2016 for counterpart European Application No. 15197335.1.

\* cited by examiner

HOUSING DEVICE FOR A COMPRESSOR STAGE OF A COMPRESSOR DEVICE THAT IS EMBODIED WITH MULTIPLE STAGES AND METHOD FOR MANUFACTURING A HOUSING DEVICE

This application claims priority to German Patent Application 102014119673.2 filed Dec. 29, 2014, the entirety of which is incorporated by reference herein.

The invention relates to a housing device for a compressor stage of a compressor device of an aircraft engine that is embodied in a multi-stage design in accordance with the type disclosed herein and to a method for manufacturing such a housing device in accordance with the type disclosed herein.

Known from practice are aircraft engines that are embodied with compressor devices that have a multi-stage design. Such a compressor device has a compressor housing in which rotor blades of rotor appliances and guide blades of stator appliances are mounted. In the axial direction of the compressor device, the compressor housing which is adjoining the rotor blades in an exterior circumferential area is embodied with multiple housing appliances that are adjoining each other, wherein one housing appliance is respectively allocated to one compressor stage.

The housing appliances of the compressor device are embodied so as to be substantially identical in construction and respectively have a flange area, via which housing appliances that are adjacent to each other in the axial direction of the compressor device are connected to each other. Further, the housing appliances are embodied with a rotor area that is provided with a running-in layer and that is arranged in a radially interior cross-sectional area of the housing appliance and acts together with the rotor blades of a rotor device during operation of the aircraft engine. Further, the housing appliances have at least one C-shaped reception area for the guide blades of a stator device into which the guide blades are inserted in the axial direction during the mounting of the compressor device and by which the guide blades are held in the axial and the radial direction of the compressor device in the mounted state of the compressor device.

Such housing appliances of known compressor devices that are formed with a flange area, a rotor area and one or two reception areas are made of a base body from solid material, wherein the base body is provided by a forging process and has a predefined machining allowance with respect to the final dimensions of the housing appliance that is to be manufactured. The desired shape of the respective housing appliance is manufactured from this base body by means of metal-cutting machining processes.

Disadvantageously, the manufacture of such housing appliances which are embodied in a complex manner with respect to their shape is work-intensive and entails high manufacturing costs. In addition, the material costs are disadvantageously high due to the fact that the housing appliances are manufactured by means of metal-cutting.

The present invention is based on the objective to provide a housing device that can be manufactured in a simple and cost-effective manner. Further, it is an objective of the present invention to provide a simple and cost-effective method for manufacturing such a housing device.

This objective is achieved with a housing device having features as disclosed herein and with a method for manufacturing such a housing device having features as disclosed herein.

What is proposed is a housing device for a compressor stage of a compressor device of an aircraft engine that is embodied in a multi-stage design, and that is embodied with one flange area for connecting to at least one housing device of another compressor stage which is adjacent in the axial direction, with a rotor area that during operation of the housing device directly acts together with the rotor blades of a rotor device in the radial direction of the compressor device, and with at least one reception area that is provided for receiving guide blades of a stator device.

In accordance with the invention, it is proposed that at least one part of the housing device be manufactured from a sheet metal part.

The housing device in accordance with the invention can be manufactured in a simple and cost-effective manner with low material costs, since, unlike with housing devices that are made of solid material, cost-intensive metal-cutting manufacturing processes can either be foregone or the share of these manufacturing processes in the manufacture of the housing device can be strongly reduced, wherein structural requirements for the housing device can be met in a simple manner by embodying at least one part of the housing device as a sheet metal part. In addition, by providing the sheet metal parts a weight of the housing device can be advantageously reduced as compared to a housing that is made of solid material by means of a metal-cutting process, since the housing device according to the invention can be manufactured with thinner wall thicknesses than conventional housing devices manufactured by means of metal-cutting. By contrast, the manufacture of a housing device with a small wall thickness by using metal-cutting methods is work-intensive or only possible up to a defined, possibly undesirably high minimal wall thickness. Here, it is particularly advantageous if the housing device is formed by a single sheet metal part.

What is referred to as a sheet metal part here is a flat finished rolling mill product made of metal, in particular one that has a constant wall thickness.

The housing device according to the invention is preferably embodied for acting together with exactly one rotor device that comprises rotor blades as well as one or two stator device[s] that comprise guide blades.

In an advantageous further development of the housing device according to the invention, the housing device is embodied with at least two parts. In this manner, the individual parts of the housing device can be embodied in a considerably simplified manner with respect to their respective design as compared to the known housing devices that are embodied as one piece, wherein the housing device according to the invention can be manufactured in an advantageously simple and cost-effective manner.

If multiple parts of the housing device are manufactured from sheet metal parts that have different wall thicknesses, the housing device can be adjusted to the loads that are occurring during operation in a particularly simple manner, and an expansion of the housing device during operation can for example be adjusted to the expansion of the rotor blades of the rotor device by means of an appropriate selection of the wall thicknesses. Here, it can particularly be provided that the part of the housing device that comprises the flange area has an enlarged wall thickness as compared to other areas of the housing device, so that a thermal expansion of the housing device during operation can be reduced to a level that substantially corresponds to that of the respective rotor device.

In a particularly advantageous embodiment of the housing device, at least one part of the housing device is manufactured by means of a forming process. Here, particularly the parts that are made of a sheet metal part can be manufactured in a cost-effective and simple manner, wherein the greater part of the processing steps is preferably performed by means of forming processes, preferably by means of forming processes that yield the exact final dimensions, during manufacture of the respective parts.

In a housing device that is optimized with respect to the number of parts as well as with respect to the manufacturing costs, a first part of the housing device comprises or forms the flange area and a second part of the housing device comprises or forms the rotor area, wherein the first part and the second part jointly form the at least one reception area. Such a housing device can be advantageously manufactured by means of just a few connection steps, particularly connection processes yielding firmly bonded connections.

In an embodiment variant of the invention that is alternative to this, a first part of the housing device comprises or forms the flange area, a second part of the housing device comprises or forms the rotor area, and at least one third part of the housing device comprises or forms the reception area for the guide blades. Such an embodiment of the housing device advantageously provides the possibility to design the parts with wall thicknesses that are adjusted to the respective requirements and that differ from each other where necessary, with all this being realizable in a simple manner.

In another alternative embodiment of the housing device according to the invention, a first part of the housing device comprises or forms the flange area and the rotor area, while at least one second part of the housing device represents the reception area of the housing device. The part that forms the reception area for receiving guide blades of a stator device is preferably embodied with a C-shaped cross section.

A housing device which is particularly stable in the flange area is achieved if that part of the housing device that forms the flange area is formed with a bend in the area of a connection site for adjacent housing devices. As a result of this, the flange area that is in particular manufactured from a sheet metal part has a wall thickness that is at least approximately doubled as compared to further areas of the parts. In this way, also the thermal expansion behavior of the housing device occurring during operation of the aircraft engine can be adjusted with little effort to the expansion behavior of the rotor blades of the rotor device.

In an advantageous embodiment of the housing device according to the invention, the parts of the housing device are connected to each other in a firmly bonded manner. Preferably, the parts are welded or soldered to each other, wherein tests have shown that a very small number of welded or solder joints results in only a small degree of deformation, wherein the occurrence of any deformations can be counteracted during the manufacturing process by means of appropriate tools, if necessary.

In an advantageous embodiment of the housing device according to the invention, the part of the housing device that comprises the rotor area is embodied with an abrasive layer or running-in layer, for example a ceramic layer, on a side that is facing towards the rotor blades of the rotor device during operation of the housing device, with the abrasive layer or running-in layer preferably being applied onto the part of the housing device that is comprising the rotor area. If the rotor blades have a larger expansion in the radial direction than the housing device, the rotor blades come into contact at their exterior areas with the abrasive running-in layer. In this way, any direct contact between the rotor blades and the part of the housing device comprising the rotor area is avoided in the event that the part of the housing device and the rotor blades show different radial expansion behaviors, which otherwise would result in material removal in the area of the part of the housing device and thus can result in undesired damage to the rotor and the housings.

The housing device can have a positioning device, for example a positioning pin or positioning spigot, or a so-called fitting hole diameter, so that as they are mounted, multiple adjacent housings can be aligned with respect to each other in the radial direction in an easy manner.

What is further proposed is a method for manufacturing a housing device as it has been described more closely above, wherein it is provided according to the invention that at least one part of the housing device is manufactured by means of a forming process.

As compared to a housing device that is manufactured from a solid material, through the method according to the invention the housing device can be manufactured in a more simple and cost-effective manner with a low self-weight and so as to be adjustable to the respectively present load case, since the respective part of the housing device can be manufactured by means of the forming process in just a few processing steps. When it comes to manufacturing a desired final contour, a housing device that is manufactured with the method according to the invention advantageously requires either no cutting methods or requires them only to a small extent.

In an advantageous embodiment of the method according to the invention, the at least one part of the housing device is manufactured by means of a forming process that yields a shape that is close to the final dimensions, a so-called near-net shape forming process. Here, the manufacture of the respective part of the housing device can be carried out in a particularly cost-effective and simple manner, as the respective part can be manufactured in a particularly low number of processing steps. Here, shear forming methods, hydro forming methods and/or roll forming methods are possible.

At least one part of the housing device is preferably made of a sheet metal part or a flat base body, wherein initially the cross section or the profile of the part is manufactured and the resulting intermediate product is subsequently converted into a ring shape, with its end areas subsequently being connected to each other, preferably in a firmly bonded manner.

In a housing device that is embodied in an alternative manner to this one, it is provided that the end areas of the ring are not directly connected to each other and that a gap is present between the end areas of the ring. In this manner, an open ring is formed. In particular the firmly bonded connection of two open rings can be carried out in an easier manner than the connection of two closed rings in which the end areas are connected to each other, as the closed rings have to be manufactured in a work-intensive and very precise manner in order to adjust a desired radial gap. The cross section of the part and the ring shape are advantageously manufactured by means of a forming process.

In an advantageous embodiment of the method according to the invention, the individual parts of the housing device are first manufactured and subsequently connected to each other in particular in a firmly bonded manner. For the purpose of connecting the individual parts of the housing device, processing steps that yield a firmly bonded connection, i.e. preferably welding or soldering steps, are necessary, which can be performed by means of tensioning and/or clamping devices in order to avoid or limit undesired deformations which may possibly require work-intensive post-processing procedures.

For example, in order to be able to achieve a wall thickness that substantially corresponds to the other areas of the parts also in the area of connection points of parts of the housing device that adjoin each other in the mounted state, it is provided in a further development of the method according to the invention that at least one area of a part of the housing device is adjusted at least in certain areas of the connection area, for example by sanding or by other machining processes suitable for this purpose.

The features specified in the patent claims as well as the features specified in the subsequent exemplary embodiments of the housing device according to the invention and the method for manufacturing a housing device according to the invention are suitable respectively individually or in any combination with one another to further develop the subject matter according to the invention.

Further advantages and advantageous embodiments of the housing device according to the invention and a method for manufacturing a housing device become apparent from the patent claims and the exemplary embodiments described in principle in the following with reference to the accompanying drawing, where the same reference numerals are used for components of identical design and function for greater clarity.

Here,

Figure 1:
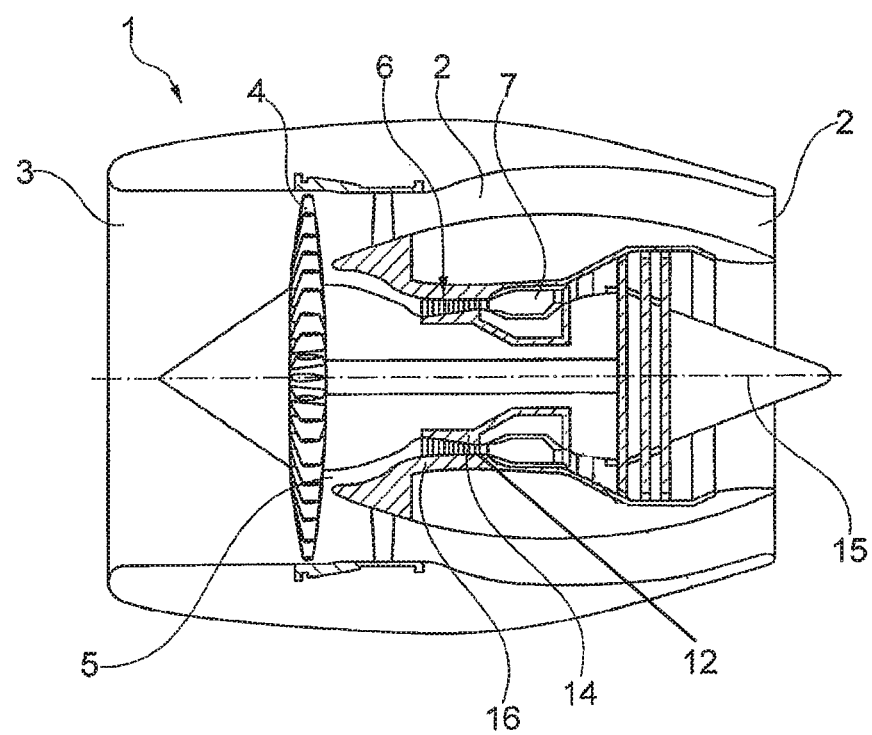
FIG. 1 shows a schematized longitudinal section view of an aircraft engine comprising a compressor device which has multiple compressor stages.

FIG. 1 shows an aircraft engine or jet engine 1 in a longitudinal section view. The aircraft engine 1 is configured with a bypass channel 2 and an inlet area 3, wherein a fan 4 connects downstream to the inlet area 3 in a per se known manner. In turn, downstream of the fan 4 the mass flow in the aircraft engine 1 is split into a bypass flow and a core flow, wherein the bypass flow flows through the bypass channel 2 and the core flow flows into an engine core 5 or a core flow channel, which is in turn embodied in a per se known manner with a compressor device 6, a burner 7 and a turbine appliance 8.

Figure 2:
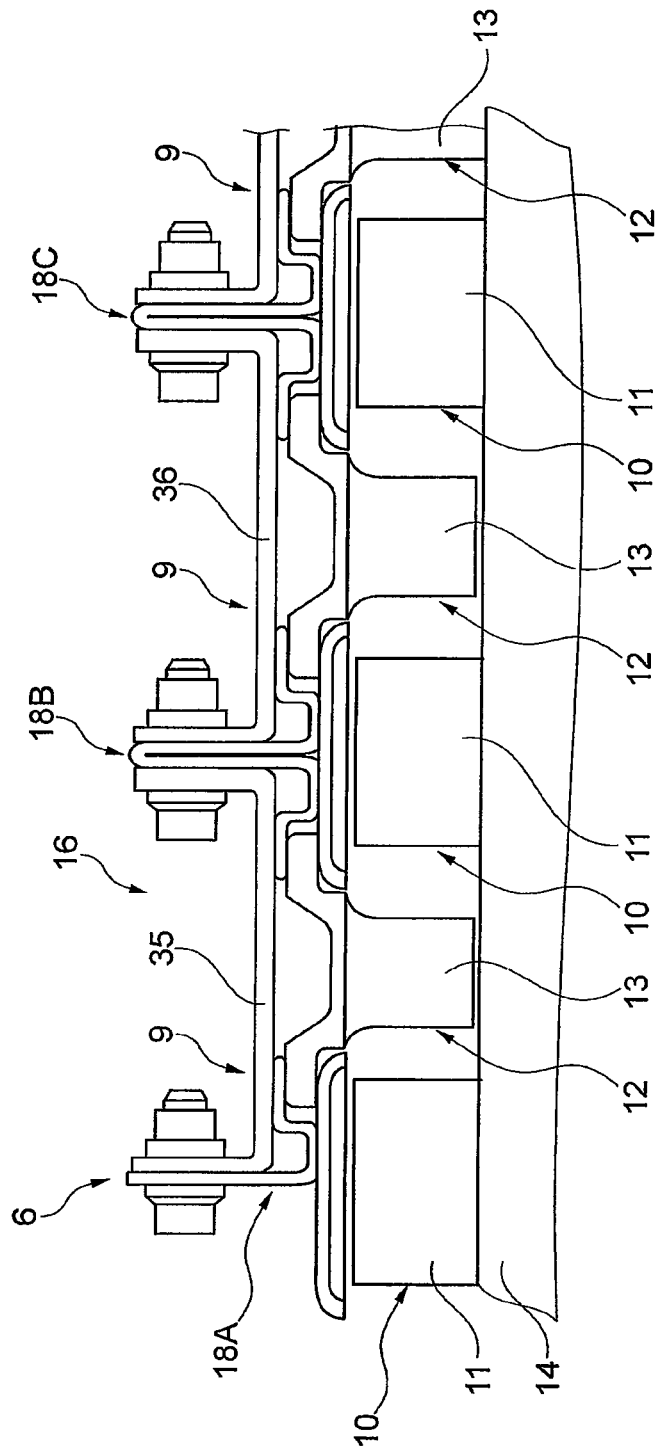
FIG. 2 shows a simplified partial sectional view of the aircraft engine of FIG. 1, wherein compressor stages of the compressor device can be seen.

A section of a compressor device 6 that is known from practice and is embodied with multiple compressor stages 9 is shown in FIG. 2, wherein three compressor stages 9 can be seen in FIG. 2. Allocated to each compressor stage 9 are respectively one rotor device 10 with circumferentially arranged rotor blades 11 and a stator device 12 with circumferentially arranged guide blades 13. The rotor devices 10 are operatively connected to a radially interior housing 14, together with which the rotor devices 10 rotate around a central axis 15 of the aircraft engine during operation of the aircraft engine 1.

In contrast, the stator devices 12 are arranged at an exterior housing 16 that surrounds the interior housing 14 in the radial direction and that separates the bypass channel 2 from the engine core 5. Here, the guide blades 13 of the stator devices 12 and the exterior housing 16 are arranged in a torque-proof manner at the engine 1. The interior housing 14 and the exterior housing 16 limit the engine core 5 in the radial direction, wherein the interior housing 14 forms an interior limitation of an air volume stream that flows through the engine core 5, and the exterior housing 16 forms an exterior limitation of the air volume stream that flows through the engine core 5.

The housing 16 has multiple housing devices 18A to 18C that are operatively connected to one another in the axial direction, and of which each housing device 18A to 18C is allocated to a compressor stage 9. Principally, the housing devices 18A to 18C are embodied in a similar manner, wherein the housing devices 18A act together with a stator device 12, and the housing devices 18B and 18C respectively act together with two stator devices 12 that are adjacent to each other in the axial direction of the aircraft engine 1.

Figure 3:
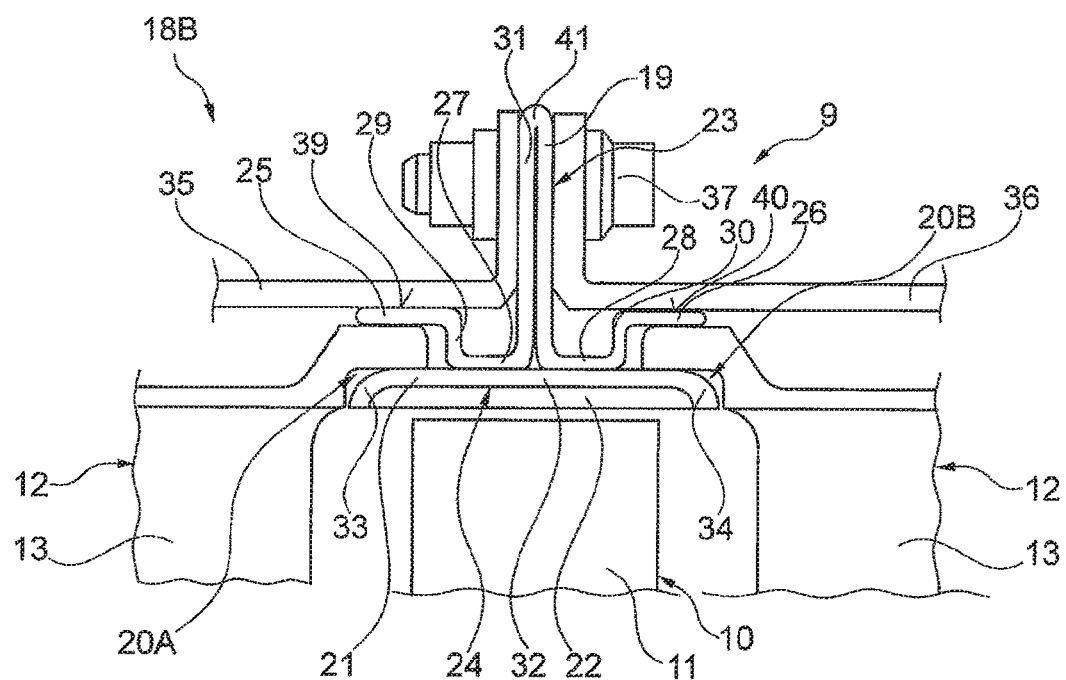
FIG. 3 shows a simplified sectional view of a first embodiment of the housing device of the aircraft engine according to the invention according to FIG. 1.

FIG. 3 shows an enlarged rendering of the housing device 18B which is regarded in the following representatively for the further housing devices 18A and 18C, since the structure of the housing devices 18A and 18C substantially corresponds to it.

In contrast to the housing device 18B, the housing device 18A has only one reception area 20A or 20B for the guide blades 13 that will be described in more detail in the following.

The housing device 18B has a flange area 19, via which two housing devices 18 that are arranged adjacent to each other in the axial direction of the aircraft engine 1 are connected to each other. In addition, the housing device 18B has a rotor area 21 which is facing the rotor blades 11 of the rotor device 10 and which is embodied with an abrasive running-in layer 22, for example a ceramic layer, on a side that is facing towards the rotor blades 11.

Further, the housing device 18B has two reception areas 20A, 20B, into which guide blades 13 of the stator devices 12 are respectively inserted or suspended in the axial direction of the aircraft engine 1. Thus, two housing devices 18 that are adjacent in the axial direction of the aircraft engine 1 fixate the guide blades 13 of a stator device 12 in the axial direction.

In the embodiment according to FIG. 3, the housing device 18B has two parts 23, 24, wherein a first part 23 comprises the flange area 19. The first part 23 is embodied with a substantially T-shaped cross section, wherein the side legs 25, 26 form a stage 29, 30 with respect to the central legs 27, 28 that act together with the second part 24, and are arranged at a distance with respect to the second part 24 in the radial direction of the aircraft engine 1. The first part 23 as well as the second part 24 are respectively manufactured by means of a forming process from a single sheet metal part that has a constant wall thickness. The sheet metal part of the first part 23 is bent by approximately 180° for the purpose of creating a bend 41, so that a middle leg 31 that substantially extends in the radial direction of the aircraft engine 1 and comprises the flange area 19 has a wall thickness that is substantially doubled as compared to the other legs 25 to 28.

The second part 24 of the housing device 18B is embodied with a central area 32 that substantially extends in the radial direction of the aircraft engine 1, with its end areas 33, 34 being bent inwards in the radial direction of the aircraft engine 1. In order to be able to exactly adjust the axial length of the second part 24, the end areas 33, 34 can be submitted to post-processing by means of forming processes during manufacture of the second part 24, where it is necessary.

In the embodiment of the housing device 18B that is shown in FIG. 3, the reception areas 20A or 20B are respectively formed by the central area 32 of the second part 24 as well as the side leg 25 or 26 and the stage 29 or 30 of the first part 23 of the housing device 18B, wherein the reception areas 20A, 20B have a substantially C-shaped cross section. Here, the parts 23 and 24 of the housing device 18B are embodied so as to be substantially symmetrical to the flange area 19.

For the purpose of connecting two housing devices 18 that are arranged so as to be adjacent to each other in the axial direction of the aircraft engine 1, housing parts 35, 36 with a U-shaped cross section are provided here, of which one housing part 35 is provided for connecting the housing device 18B to the housing device 18A, and one housing part 36 is provided for connecting the housing device 18B to the housing device 18C. Here, the housing parts 35, 36 are arranged by means of a screw connection 37 at the first part 23 of the housing device 18B respectively in the flange area 19, wherein for this purpose the first part 23 of the housing device 18B has a bore 38 in the flange area 19 that can be seen in more detail in FIG. 5. Multiple such bores 38 are provided, distributed at the circumferential side. In the mounted state, the housing parts 35 or 36 adjoin an exterior surface area 39 or 40 of the side legs 25 or 26 and are connected to these in particular in a firmly bonded manner.

Figure 4:
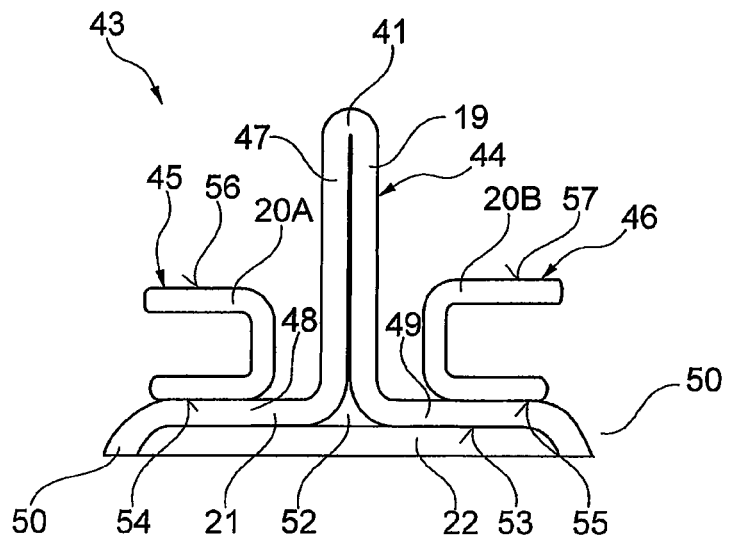
FIG. 4 shows a rendering of a second embodiment of the housing device according to the invention that corresponds to FIG. 3.

FIG. 4 shows a second embodiment of a housing device 43 according to the invention, which is allocated to a compressor stage 9 of the compressor device 6 of the aircraft engine 1 according to FIG. 1 in a manner comparable to the housing device 18B according to FIG. 3, and which is substantially based on the same functional principle as the housing device 18B according to FIG. 3, except for the differences as they will be described in the following.

The housing device 43 is embodied with three parts 44, 45 and 46, wherein a first part 44 of the housing device 43 comprises the flange area 18 and the rotor area 21 and has a T-shaped profile in cross section. The first part 44 is embodied with a middle leg 47 which is configured in a manner comparable to the middle leg 31 of the housing device 18B and to which respectively one side leg 48 or 49 connects in the axial direction of the aircraft engine 1. Here, the side legs 48 and 49 jointly form the rotor area 21 and are again bent inward in the radial direction of the aircraft engine 1 at their end areas 50, 51 that face away from the middle leg 47 in the axial direction of the aircraft engine 1. Again, the parts 44, 45 and 46 respectively have a constant wall thickness and are arranged symmetrically with respect to the flange area 19.

As the first part 44 is manufactured from a sheet metal part by means of forming processes, a groove 52 is created in a transitional area between the middle leg 47 and the side legs 48, 49. In order to still be able to create a surface 53 with a substantially flat cross section for the purpose of arranging the abrasive layer 22, a soldering wire can be inserted into the groove 52 during manufacture of the first part 44, and the surface 53 can be subsequently submitted to post-processing, if necessary.

The second part 45 and the third part 46 of the housing device 43 have a C-shaped profile in the cross section, wherein an opening of the second part 45 and of the third part 46 respectively in the axial direction of the aircraft engine 1 points into a direction that is facing away from the middle leg 47. With a surface area 54, 55 that is facing inward in the radial direction of the aircraft engine 1, the parts 45, 46 are connected in a firmly bonded manner to the first part 44 in an area that is facing towards the end area 50 or 51 of the side leg 48 or 49. The surface areas 56, 57 of the parts 45, 46 that are facing outward in the radial direction of the aircraft engine 1 are provided in the manner as it has been described in more detail above for the purpose of acting together with the housing parts 35 or 36.

Figure 5:
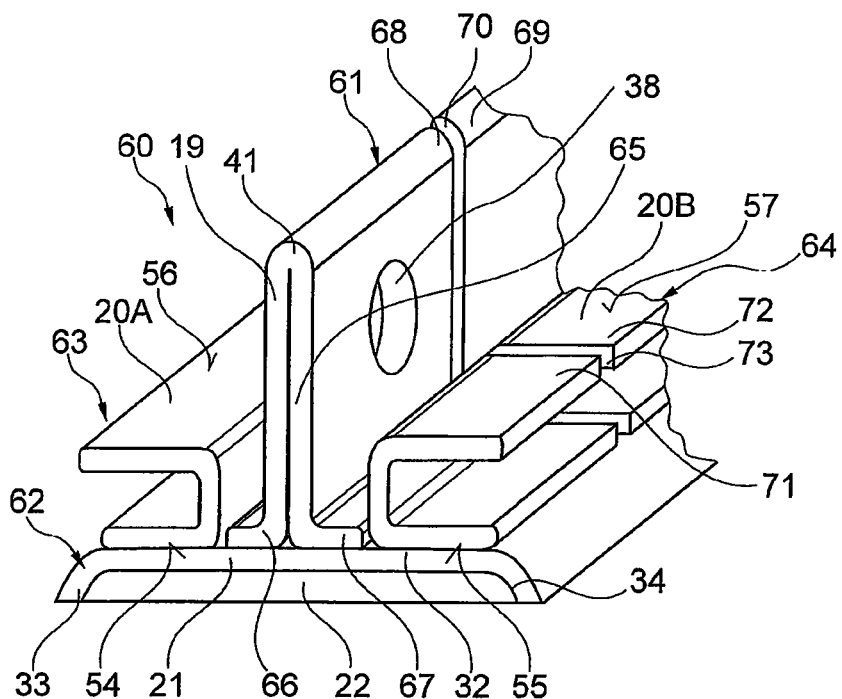
FIG. 5 shows a simplified three-dimensional rendering of a third embodiment of the housing device according to the invention.

FIG. 5 shows a third embodiment of a housing device 60 that is embodied according to the invention, which also can be used in a compressor stage 9 of the compressor device 6 of the aircraft engine 1. Again, the functional principle of the housing device 60 substantially corresponds to the functional principle of the housing devices 18B and 43, respectively, which is why only the differences that distinguish it from these housing devices 18B and 43 will be discussed in the following, and it is referred to the description pertaining to FIG. 3 and FIG. 4 when it comes to the other functions.

The housing device 60 is embodied with four parts 61, 62, 63, 64. In this embodiment, each area 19, 20A, 20B and 21 is formed by a separate part 61, 62, 63 or 64. The first part 61 that is forming the flange area 19 is embodied in a T-shaped manner with a middle leg 65 and side legs 66, 67 that are connecting to the same in the axial direction of the aircraft engine 1, wherein the side legs 66, 67 have a smaller extension in the axial direction of the aircraft engine 1 as compared to the side legs 25, 26 or 48, 49, with the extension being chosen in such a manner that a stabile attachment at the second part 62 forming the rotor area 21 is assured.

The second part 62 of the housing device 60 is embodied in a manner substantially identical to the second part 24 of the housing device 18B, and the third part 63 and fourth part 64 of the housing device 60 are embodied in a manner corresponding to the second part 45 and the third part 46 of the housing device 43. A connection of the third part 63 and of the fourth part 64 of the housing device 60 to the second part 62 of the housing device 60 is embodied in an analogous manner to the connection of the second part 45 and the third part 46 of the housing device 43 to the first part 47.

Also in this embodiment, each of the parts 61, 62, 63, 64 has a constant wall thickness. In addition, the parts 61, 62, 63, 64 are embodied so as to be symmetrical with respect to the flange area 19.

In the present case, all parts 23, 24, 44, 45, 46, 61 to 64 are respectively manufactured from a sheet metal part, i.e. from a finished flat rolling mill product that is representing a flat strand with a substantially constant wall thickness. During the manufacture of the parts 23, 24, 44, 45, 46, 61 to 64, at first the cross sections of the parts 23, 24, 44, 45, 46, 61 to 64 are respectively manufactured in forming steps, wherein a roll forming method is preferably used as a forming process, in particular as a near-net shape forming process. Subsequently, the intermediate products that are manufactured in this process are in turn imprinted with a ring shape in a forming process for the purpose of forming the parts 23, 24, 44, 45, 46, 61 to 64, wherein the end areas of the ring are respectively connected to each other by means of a method that yields a firmly bonded connection, in particular by means of welding or soldering. As is shown for part 61 in a schematic manner in the embodiment according to FIG. 5, the end areas 68, 69 of part 61 are not connected to each other, but instead a gap 70 is present between the end areas 68, 69 after the ring shape is imprinted. In a manner that is comparable to that, also the end areas 71, 72 of the parts 63 and 64 are arranged at a distance from each other in the present case, wherein this can only be seen for part 64 in FIG. 5. Thus, a gap 73 is present between the end areas 71, 72 of the parts 63 and 64 after the manufacture of the respective ring shape, and an open ring is formed.

After manufacture of the respective parts 23, 24, 44, 45, 46, 61 to 64 of a housing device 18B, 43, 60, the parts 23, 24, 44, 45, 46, 61 to 64 of the respective housing device 18B, 43, 60 are connected to each other in the manner described above by means of methods that yield a firmly bonded connection, preferably by means of welding or soldering.

In order to meet the high requirements, for example when it comes to the dimensions of the reception areas 20A, 20B, it can for example be provided that the reception areas 20A, 20B are submitted to post-processing.

PARTS LIST 1 jet engine
2 bypass channel
3 inlet area
4 fan
5 engine core
6 compressor appliance
7 burner
8 turbine appliance
9 compressor stage
10 rotor device
11 rotor blade
12 stator device
13 guide blade
14 interior housing
15 central axis
16 exterior housing
18A to 18C housing device
19 flange area
20A, 20B reception area
21 rotor area
22 abrasive layer
23 first part
24 second part
25, 26 side leg
27, 28 central leg
29, 30 stage
31 middle leg
32 central area
33, 34 end area
17
35, 36 housing part
37 screw connection
38 bore
39, 40 surface area
41 bend
43 housing device
44 first part
45 second part
46 third part
47 middle leg
48, 49 side leg
50, 51 end area
52 groove
53 surface
54 to 57 surface area
60 housing device
61 first part
62 second part
63 third part
64 fourth part
65 middle leg
66, 67 side leg
68, 69 end areas
70 gap
71, 72 end areas
73 gap

The invention claimed is:

1. A housing device for a compressor stage of a multi-stage compressor device of an aircraft engine, comprising:
   a flange area for connection to a further housing device of a further compressor stage that is adjacent to the compressor stage in an axial direction of the aircraft engine,
   a rotor area that directly acts together with rotor blades of a rotor device of the compressor stage in a radial direction of the multi-stage compressor device during operation of the housing device, and
   a reception area for receiving guide blades of a stator device,
   wherein at least one chosen from the flange area, the rotor area and the reception area is made from sheet metal,
   wherein a first sheet metal part of the housing device comprises the flange area, a second sheet metal part of the housing device comprises the rotor area and at least one third sheet metal part of the housing device comprises the reception area.

2. The housing device according to claim 1, wherein at least two chosen from the flange area, the rotor area and the reception area is made from sheet metal, where the sheet metal of the of the different areas has different wall thicknesses.

3. The housing device according to claim 1, wherein at least one chosen from the flange area, the rotor area and the reception area includes a bent sheet metal portion.

4. The housing device according to claim 1, wherein the flange area includes a bend in an area of the connection to the further housing device.

5. The housing device according to claim 1, wherein the flange area, the rotor area and the reception area are firmly bonded together.

6. The housing device according to claim 1, wherein the rotor area includes an abrasive layer on a side that faces towards the rotor blades.

7. A method for manufacturing a housing device for a compressor stage of a multi-stage compressor device of an aircraft engine, comprising:
   providing for the housing device:
      a flange area for connection to a further housing device of a further compressor stage that is adjacent to the compressor stage in an axial direction of the aircraft engine,
      a rotor area that directly acts together with rotor blades of a rotor device of the compressor stage in a radial direction of the multi-stage compressor device during operation of the housing device, and
      a reception area for receiving guide blades of a stator device,
   providing that at least one chosen from the flange area, the rotor area and the reception area is made from sheet metal;
   providing that a first sheet metal part of the housing device comprises the flange area, a second sheet metal part of the housing device comprises the rotor area and at least one third sheet metal part of the housing device comprises the reception area;
   providing that at least one chosen from the flange area, the rotor area and the reception area has been manufactured by a forming process.

8. The method according to claim 7, wherein the forming process is a near-net shape forming process.

9. The method according to claim 7, and further comprising:

manufacturing an intermediate cross-section of at least one chosen from the flange area, the rotor area and the reception area a flat base body, subsequently converting the intermediate cross-section into a ring shape, connecting end areas of the ring shape to each other or arranging the end areas at a distance from each other to provide a gap between the end areas.

10. The method according to claim 7, and further comprising manufacturing the flange area, the rotor area and the reception area as separate components and subsequently connecting the flange area, the rotor area and the reception area to each other in a firmly bonded manner.

11. The method according to claim 7, and further comprising submitting at least one chosen from the flange area, the rotor area and the reception area to post-processing.

12. A housing device for a compressor stage of a multi-stage compressor device of an aircraft engine, comprising:

a flange area for connection to a further housing device of a further compressor stage that is adjacent to the compressor stage in an axial direction of the aircraft engine, a rotor area that directly acts together with rotor blades of a rotor device of the compressor stage in a radial direction of the multi-stage compressor device during operation of the housing device, and a reception area for receiving guide blades of a stator device, wherein at least one chosen from the flange area, the rotor area and the reception area is made from sheet metal;

wherein a first sheet metal part of the housing device comprises the flange area and the rotor area and a second sheet metal part of the housing device includes the reception area.

* * * * *